E. B. NYE.
ANTI-SKIDDING DEVICE FOR AUTOMOBILES.
APPLICATION FILED NOV. 18, 1919.

1,362,572.

Patented Dec. 14, 1920.

Inventor

Earl B. Nye

William Fletcher & Co.

Attorney

UNITED STATES PATENT OFFICE.

EARL B. NYE, OF NITRO, WEST VIRGINIA.

ANTISKIDDING DEVICE FOR AUTOMOBILES.

1,362,572.  Specification of Letters Patent.  Patented Dec. 14, 1920.

Application filed November 18, 1919. Serial No. 338,864.

*To all whom it may concern:*

Be it known that I, EARL B. NYE, citizen of the United States, residing at Nitro, in the county of Putnam and State of West Virginia, have invented certain new and useful Improvements in Antiskidding Devices for Automobiles; and I do hereby declare the following to be a full, clear, and exact description of the invention, such as will enable others skilled in the art to which it appertains to make and use the same.

This invention relates to anti skidding devices for automobiles.

An object of this invention is to provide an improved and simplified device for attachment to the tires of automobiles and the like for the purpose of preventing the skidding of said tires and to provide an improved system of chains for this purpose and improved means of affixing the chains to the wheel.

A further object of this invention is to provide a means for evenly distributing the chains over the wheel periphery and to provide a means whereby a minimum weight and number of chain sections can be utilized for performing the desired function of preventing the skidding of the tire.

A further object of this invention is to provide for increasing or decreasing the member of chain sections as may be desired to suit the conditions and to provide for a quick and ready means of so doing.

A further object of this invention is to provide a means by which the chain sections may be quickly and easily detached or attached to the automobile wheel.

With these and other objects in view the invention consists of the construction, the combination, the detail and arrangements of parts as hereinafter more fully described and claimed.

Figure 1:
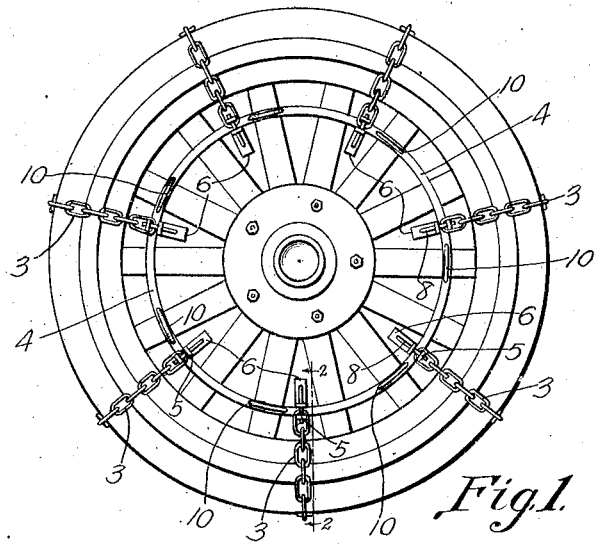
Figure 1 is a side elevation of an automobile wheel with a series of my chains attached.
Figure 2:
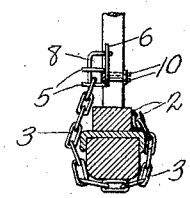
Fig. 2 is a section at 2—2 in Fig. 1.
Figure 4:
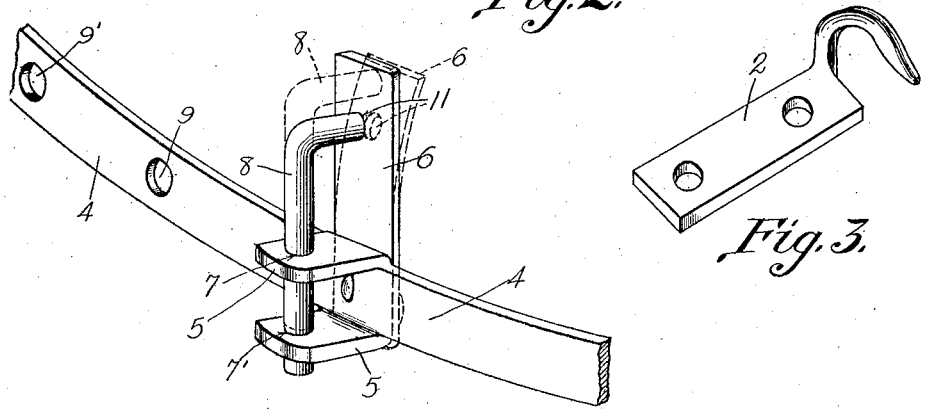
Fig. 4 is a fragmentary perspective of a part of the annulus and attachment to said annulus illustrated in Fig. 1.
Figure 3:
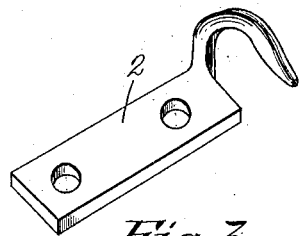
Fig. 3 is a perspective of hook 2 in Fig. 2.

In detail the invention consists of a hook 2 affixed to the inside of the felly of an automobile wheel, a chain 3 and an annulus 4, said annulus 4 having affixed thereto at predetermined distances spacing yokes 5 and a spring 6, said yokes 5 being provided with holes 7 and 7' to receive a key 8, said annulus being perforated at alternate spoke positions with two holes 9 and 9' to receive respectively a U bolt 10, which U bolt 10 locks the annulus upon the spokes of the wheel.

In applying my device to an automobile wheel I affix the annulus 4 to the wheel by the U bolt 10 and affix hooks 2 also to the wheel at spaces corresponding to the spacing of the yoke members 5 and then the chains can be applied at will and as desired. All that is necessary to apply the chains is to insert them into hook 2 and then into yoke 5 and insert the key 8 by the yielding of spring 6 until key 7 reaches a hole 11 in spring 6, which will retain key 8 in place.

It is therefore obvious that these chain sections can be quickly and easily attached or detached at will and that the normal and fixed members remaining on the wheel will not in any manner interfere with the utility of the wheel, so that I have provided an attachment to an automobile wheel which provides an anti skidding device of very simplified structure and of very light weight and one of universal application and easily variable to suit varying conditions, and one of which the whole or part thereof can be immediately removed when it is not desired to utilize the same.

Claims:

1. An anti-skidding device including an annulus, perforated yokes carried thereby, a key member adapted to be inserted in the perforations in the yoke and a spring member carried by the annulus for engagement with the key to retain the same in position.

2. An anti-skidding device for wheels, including an annulus having perforated yokes thereon, pin members adapted for insertion within the perforations of the yokes, said pins having angularly disposed outer ends, spring members carried by the annulus and each having a perforation to receive the angular ends of the pins to retain said pins in position within the yokes.

3. An anti-skidding device for wheels, including an annulus detachably connected to the spokes of wheel, a plurality of chains each having one of their ends detachably connected to the felly of the wheel, perforated yokes carried by the annulus, removable pins inserted into the perforations of the yokes, said chains being passed around the tire of the wheel and engaged with said pins and spring members carried by the annulus for engagement with the pins to retain the same in position.

In testimony whereof I affix my signature.

EARL B. NYE.